United States Patent [19]

Richey

[11] Patent Number: 4,715,744
[45] Date of Patent: Dec. 29, 1987

[54] FLOATING BREAKWATER

[76] Inventor: Alvin Richey, 2044 N. Manor Dr., Erie, Pa. 16505

[21] Appl. No.: 941,045

[22] Filed: Dec. 12, 1986

[51] Int. Cl.$^4$ ............................................... E02B 3/06
[52] U.S. Cl. ...................................... 405/26; 405/21; 405/28
[58] Field of Search ......................... 405/26, 28, 63–72

[56] References Cited

U.S. PATENT DOCUMENTS

| | | | |
|---|---|---|---|
| 226,663 | 4/1880 | Kirkup | 405/26 |
| 2,185,458 | 1/1940 | Giliasso | 405/26 |
| 3,592,008 | 7/1971 | Trindle | 405/67 X |
| 3,691,774 | 9/1972 | Hard | 405/26 |
| 3,969,901 | 7/1976 | Matsudaira et al. | 405/26 X |
| 4,398,844 | 8/1983 | Jaffrennou et al. | 405/71 X |

FOREIGN PATENT DOCUMENTS 0184107  11/1982  Japan ...................... 405/26

Primary Examiner—Dennis L. Taylor
Attorney, Agent, or Firm—Charles L. Lovercheck; Wayne L. Lovercheck; Dale R. Lovercheck

[57] ABSTRACT

This invention relates to a shore protection device and more particularly to breakwaters for protecting shorelines against wave damage and erosion. The floating breakwater is manufactured primarily from steel plate between $\frac{3}{8}$" thick and $\frac{3}{16}$" thick which may be cold rolled steel. The assembly is basically similar to a large floating barge that has some unique design characteristics that allow it to have excellent performance as a breakwall. It is designed to be simple and easy to manufacture, (there are no unusual bending or rolling operations required) and it may be floated to the site or the shoreline which needs protection. Its main feature is that it is designed to break up the tremendous power and force of wave action as the waves come rolling toward the shore, which makes the wave quiescent as it continues on toward the shoreline after it goes over and under the floating breakwater. The wave is quieted to the extent that the wave will deposit sand and suspended solids and thereby continue to protect and build the shoreline.

11 Claims, 5 Drawing Figures

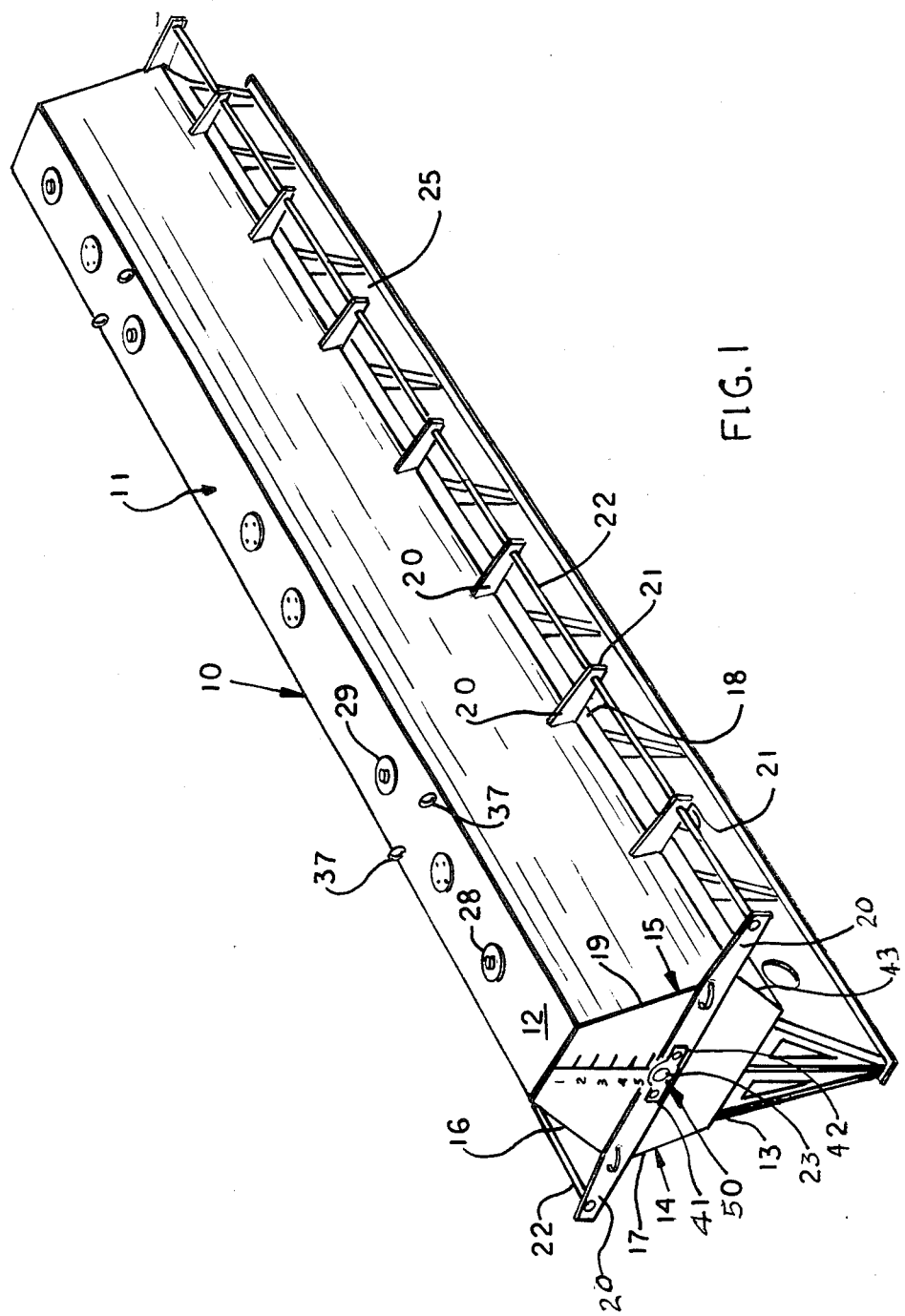

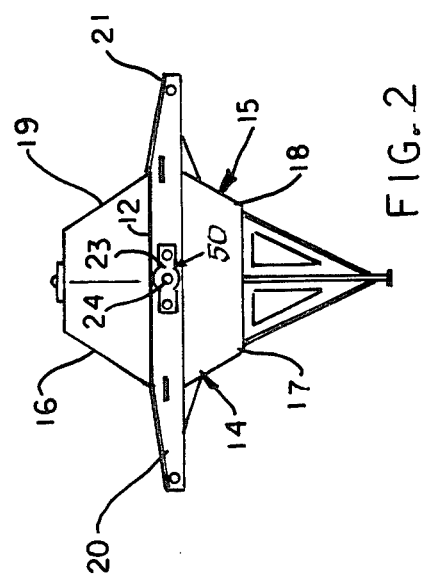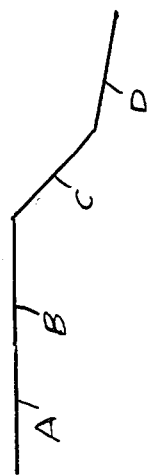

FLOATING BREAKWATER

STATEMENT OF THE INVENTION

This invention relates to a shore protection device and more particularly to breakwaters for protecting shorelines against wave damage and erosion. The floating breakwater is manufactured primarily from steel plate between ⅜" thick and 3/16" thick which may be cold rolled steel. The assembly is basically similar to a large floating barge that has some unique design characteristics that allow it to have excellent performance as a breakwall. It is designed to be simple and easy to manufacture, (there are no unusual bending or rolling operations required) and it may be floated to the use site or the shoreline which needs protection. Its main feature is that it is designed to break up the tremendous power and force of wave action as the waves come rolling toward the shore, which makes the wave quiescent as it continues on toward the shoreline after the water goes over and under the floating breakwater. The wave is quieted to the extent that the wave will deposit sand and suspended solids and thereby continue to protect and build the shoreline.

The breakwater may be, for example, eighty (80) feet in length, about twenty (20) feet wide and about eighteen (18) feet in height. It is anchored in place by a swivel on each end through which cables run, one to the starboard side and one to the port side, looking at the end view of the floating breakwater. The cables are connected by shackles to anchors placed on the bottom of the body of water.

The breakwater is movable. It can be repaired and replaced easily, should any damage occur to it, although it will have a very long life cycle. One of the unique features about the design of the breakwater is the outriggers which are incorporated to help break up the waves thus rendering them quiescent after the waves go over the top of the breakwater, which is sloped to let the wave run right up over it and move toward the shore side of the breakwater and gently roll along the surface of the water and proceed toward the shoreline, allowing sand deposit to take place.

Another feature of the breakwater is that is can be ballasted, and it can be positioned anywhere from say, six (6) feet above the surface of the water to any distance below the surface of the water. It could be completely submerged, if desirable to do so. It has a keel along the bottom which provides stability to the floating breakwater so that it will, in conjunction with the cables and the swivel attaching it to the bottom of a body of water, allow the breakwater to rock freely and easily. It also has some lightening holes. The lightening holes in the keel allow the water that comes in onto the shore to slow it down and direct it back out into the body of water to further allow time for suspended solids to deposit on the shore, and also allow the water to go back into the body of water without excessive stress on the floating breakwater itself.

The system could be assembled for example, in sections of four (4) or five (5) eighty (80) foot units at a time and each unit interconnected. The eighty (80) foot units can be easily unshackled from one another and towed back to a repair facility for maintenance, if any damage should ever occur to the breakwater. Another unit could be put in its place in the meantime. That kind of rotation could go on for years, if they were required to have any maintenance.

Another notable feature is that the system can be moved easily to other locations. Should the water level recede in some years, the breakwater can be placed further out from the shoreline or it could be taken away completely from the shoreline and moved to some other location requiring shoreline build-up or protection. So its transferability makes it very desirable in that regard. It is not a fixed breakwater, put there for life, or one that would be readily battered by the sea and worn and depreciated and destroyed by the elements.

Another feature is economy of manufacture. The units could be produced near the location where they are to be used. Shipyards which are no longer active could easily be re-tooled to produce a product of this type, since it is basically a floating barge with unique features that are incorporated to break up the forces of the waves and deposit constructive sand deposits along the shoreline.

The method of raising and lowering the height of the breakwater in the water or the depth of it in the water is simply done by valves on the top surface of the floating breakwater. These valves may be opened to allow water to come in and submerge the floating breakwater and vice versa. They would be opened and connected to a compressor to force the water out, similar to a submarine ballasting system, to bring the unit to a high location relative to the surface of the water or to put it partially submerged in the water. The simple ballasting system gives the breakwater great flexibility. One eighty (80) foot unit section may be held to the next one—to the next one—and so on, to the next one through the bottom anchoring system, and also through connecting cables between the units, very simply shackling them together to have it be one integrated assembled system. The breakwater provides total flexibility to allow for rise and fall of the body of water during various wind conditions without undue stress on the anchoring system or on the floating breakwater itself.

REFERENCE TO PRIOR ART

Applicant is aware of the following patents, but none of these patents show a floating breakwater having the characteristics set forth in the claims or which give the results possible with the breakwater shown and claimed herein. U.S. Pat. Nos.:

3,595,026 to Scholl;
3,628,334 to Coleman;
3,673,805 to Szyfter;
3,863,455 to Fuller;
3,969,901 to Matsudaira et al;
4,023,370 to Watson;
4,048,802 to Bowley;
4,098,086 to Desty et al;
4,123,185 to Hagen et al;
4,136,994 to Fuller;
4,142,816 to Kramer;
4,234,266 to Angioletti;
4,264,233 to McCambridge;
4,364,691 to Wirt;
4,406,564 to Hanson;
4,407,607 to McCambridge.

BRIEF DESCRIPTION OF THE DRAWINGS

FIG. 1 is an isometric view of the breakwater according to the invention;

FIG. 2 is an end view of the breakwater shown in FIG. 1;

FIG. 3 is a front view of the breakwater shown in a body of water, as it would be in use; and, FIG. 4 is a front view of the breakwater shown floating in a body of water;

FIG. 5 is a schematic view showing several breakwaters according to the invention connected in series.

DETAILED DESCRIPTION OF THE DRAWINGS

Figure 4:
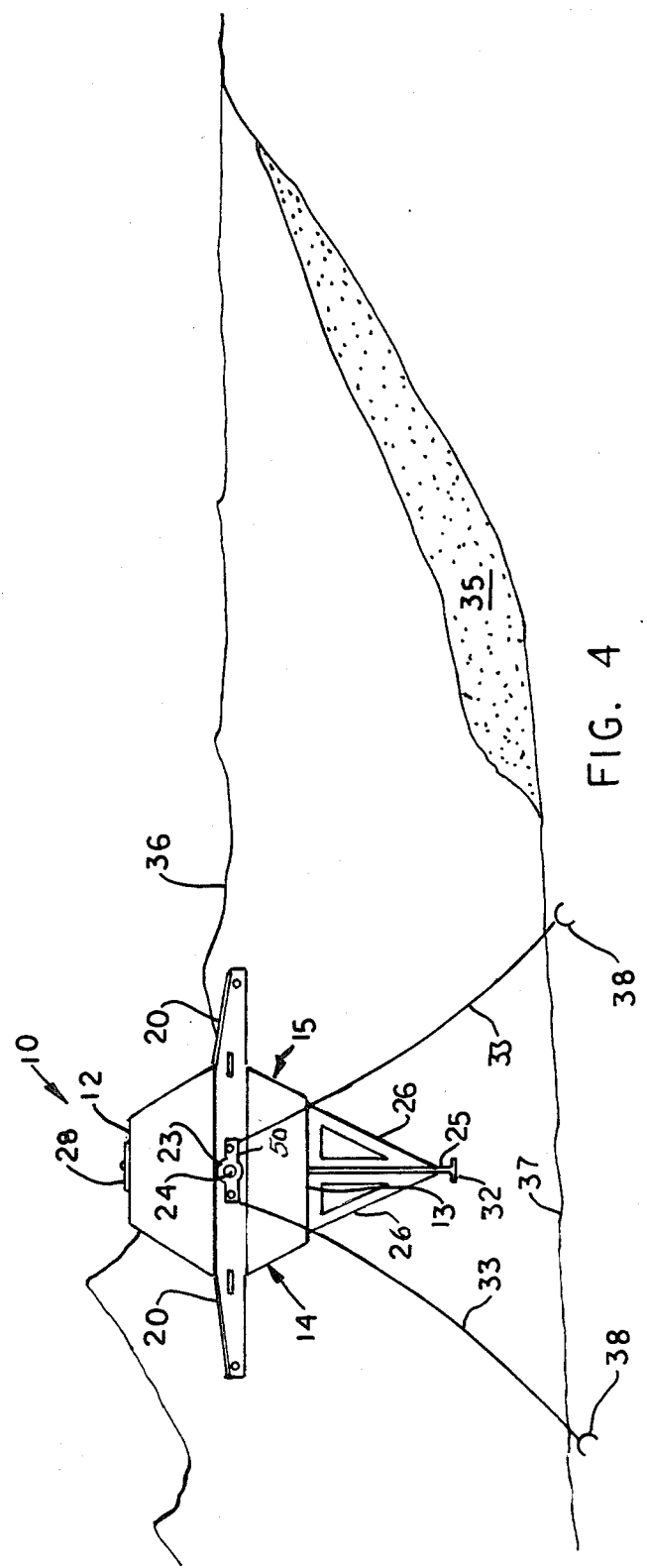

Now with more particular reference to the drawings, a breakwater 10 is shown having a body 11 having a top 12, bottom 13, a first side 14 and a second side 15, made up of first upper side member 16, first lower side member 17, second lower side member 18 and second upper side member 19. A row of outrigger members 20 are supported on each side of the breakwater. Intermediate outrigger members 20 have their distal ends 21 connected by a rail 22. The ends 21 are welded to the sides 16, 17, 18 and 19 at corners 43. The swivel 50 is pivotally connected at 23 to the end of the breakwater 10 on an axis 24. A plate-like keel 25 is fixed to the bottom 13 of the breakwater 10 and extends longitudinally of the breakwater. Spaced gussets 26 are welded to keel 25 and to the bottom of the breakwater 10 to stabilize it.

The top 12 has spaced valve members 28 provided for access to the inside of the body 11. Spaced bulkheads 30 are attached to the inside of breakwater 10. Bulkheads 30 are attached to the top 12, bottom 13 and sides 14 and 15 and provide spacers to prevent water inside the breakwater from flowing rapidly from one end of the breakwater 10 to the other. Keel 25 has openings 31 formed in it, which allow water to flow through to stabilize the keel 25. The bottom edge of keel 25 has a plate 32 fixed to its bottom of the body of water perpendicular to the keel 25 to protect the keel.

The swivel 50 has a lug having ends 41 and 42 having lines 33 attached to it. Lines 33 have anchors 38 attached to their lower ends. The anchors are of a conventional type familiar to those skilled in the art.

The sand deposits along the shore line of the body of water are indicated at 35. The surface of the water in FIG. 3 is indicated at 36. A lifting ring 37 is attached to the top of the breakwater which can be used for conveniently lifting the breakwater by means of a crane or the like, during fabrication or transportation.

The bulkheads 30 inside the body 11 will have openings 40 to allow water inside the body 11 to flow from one compartment to the other.

FIG. 5 shows breakwaters A, B, C and D according to the invention flexibly connected together. The breakwaters can be connected together by ropes, chains or other connectors attached to pivots 24.

The foregoing specification sets forth the invention in its preferred, practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A floating breakwater comprising an elongated hollow body having a top, bottom, first side, second side, first end and a second end attached together forming a water tight body,
   a plate-like keel fixed to said bottom of said body and extending downwardly and extending from one end of said body to the other,
   first outrigger means attached to said first side and extending outwardly therefrom,
   second outrigger means attached to said second side of said body and extending outwardly therefrom,
   first swivel means is pivotally attached to said first end of said breakwater,
   second swivel means pivotally attached to said second end of said breakwater,
   said swivel means having means thereon to attach said swivel means to an anchor line whereby said breakwater can be anchored in place along a shoreline for decelerating waves,
   said hollow body having bulkheads therein attached to said first side of said body, to said second side of said body, to said bottom of said body dividing said body into a plurality of compartments, whereby a water ballast in said breakwater is prevented from flowing from one end thereof to the other to change the weight thereof,
   said bulkheads having laterally spaced openings through them allowing water in said breakwater to redistribute itself in said body at a controlled rate to restrain the movement of said breakwater,
   said top of said body has spaced openings therein and covers for said spaced openings whereby ballasts can be introduced into and removed from said breakwater body.

2. The breakwater recited in claim 1 wherein said top of said body is flat,
   said spaced openings therein have covers.

3. The breakwater recited in claim 1 wherein said top is flat and said bottom is flat and generally parallel to said top.

4. The breakwater recited in claim 3 wherein said keel has a plate-like configuration and is fixed to said bottom,
   spaced gussets are fixed to said bottom and to said keel for holding said keel is position.

5. The breakwater recited in claim 4 wherein spaced relatively large holes are formed in said keel and disposed between said gussets whereby water can flow through said holes having its velocity reduced.

6. A floating breakwater comprising an elongated hollow body having a top, bottom, first side, second side, first end and a second end attached together in water tight relation,
   a plate-like keel fixed to said bottom of said body and extending downwardly and extending from one end of said body to the other,
   first outrigger means attached to said first side and extending outwardly therefrom,
   second outrigger means attached to said second side of said body and extending outwardly therefrom,
   first swivel means pivotally attached to said first end of said breakwater,
   second swivel means pivotally attached to said second end of said breakwater,
   said swivel means having means thereon to attach said swivel means to an anchor line whereby said breakwater can be anchored in place along a shoreline for decelerating waves,
   said body has spaced bulkheads on the inside thereof,
   each said bulkhead engages said top, bottom, sides and form partitions in said body.

7. The breakwater recited in claim 6 wherein said bulkheads have holes therein provided for circulating water in said body to distribute as ballast therein.

8. The breakwater recited in claim 7 wherein a plurality of said breakwaters are provided, means is provided for flexibly connecting said breakwaters together forming a line of breakwaters.

9. The breakwater recited in claim 7 wherein said outriggers each have an outer end, a rail is attached to said outer end of each said outrigger and extends from one end of said breakwater to the other for stabilizing said breakwater.

10. The breakwater recited in claim 1 wherein said swivel member is pivoted to said body about an axis parallel to the central axis of said body.

11. The floating breakwater recited in claim 10 wherein said first swivel means and said second swivel means have means thereon to attach said swivel means to an anchor line whereby said breakwater can be anchored in place along a shoreline for decelerating waves.

* * * * *